US006651302B2

(12) United States Patent
Chian et al.

(10) Patent No.: US 6,651,302 B2
(45) Date of Patent: Nov. 25, 2003

(54) METHOD FOR DISMANTLING A GUIDE RING

(75) Inventors: Po-Chung Chian, Hsinchu (TW); Sam Hu, Hsinchu (TW); Stanley Sung, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 13 days.

(21) Appl. No.: 09/995,556

(22) Filed: Nov. 29, 2001

(65) Prior Publication Data

US 2003/0097742 A1 May 29, 2003

(51) Int. Cl.$^{7}$ ................................................ B23P 19/04

(52) U.S. Cl. ..................... 29/402.03; 29/426.5; 29/239; 29/275

(58) Field of Search ......................... 29/402.01, 402.03, 29/402.08, 426.1, 426.5, 239, 270, 271, 407.09, 407.01, 275, 254; 451/458

(56) References Cited

U.S. PATENT DOCUMENTS 6,305,062 B1 * 10/2001 Chen et al. .............. 29/402.08

* cited by examiner

*Primary Examiner*—Gregory Vidovich
*Assistant Examiner*—Jermie E. Cozart

(57) ABSTRACT

The present invention is to provide an auxiliary tool for dismantling a guide ring, and an application method of the same. The auxiliary tool of the present invention for dismantling a guide ring is to install a plurality of supporting elements on the top of a guide ring whose structure is the same as that of the guide ring to be dismantled, thereby dismantling the guide ring closely engaged with a top ring module, wherein the top ring module is used in a chemical-mechanical polishing (CMP) machine for carrying a wafer, and the guide ring to be dismantled is for holding the wafer within the top ring module. The application method of the auxiliary tool for dismantling a guide ring is first to insert the supporting elements of the auxiliary tool of the present invention into the grooves of the top ring modules, and thereafter to tap a combined surface of the guide ring and top ring module in a way like plotting a circle, so as to disengage the guide ring from the top ring module. The application of the present invention can significantly reduce the time for replacing a guide ring thereby cutting the maintenance cost, and further prevent the top ring module from cracking, wherein the cracking event is resulted from the force exerted by maintenance crew, and usually would cause the top ring module to be totally scrapped.

9 Claims, 5 Drawing Sheets

METHOD FOR DISMANTLING A GUIDE RING

FIELD OF THE INVENTION

The present invention relates to an auxiliary tool for dismantling a guide a ring and an application method of the same, and more particularly, to an auxiliary tool for dismantling a guide ring which is closely engaged with a top ring module, and to an application method of the same.

BACKGROUND OF THE INVENTION

Nowadays, among those well-developed techniques for the planarization of semiconductors, the chemical-mechanical polishing (CMP) method is one of the major methods for the purpose of global planarization. Both mechanical polishing and chemical reaction are utilized in the CMP method for polishing the wafer to gradually planarize the profile of the wafer surface, thereby achieving the goal of global planarization that advantages the following processes, such as a deposition process and a lithographic process, etc.

Referring to FIG. 1, FIG. 1 is a schematic diagram showing the structure of a conventional CMP machine, for example, a CMP machine manufactured by Ebara Corporation, Japan. During the CMP process, a top ring module 10 is installed for pressing a wafer 40 to contact a polishing pad 30 on a turntable (not shown), wherein the top ring module 10 is connected to a top ring shaft 50 located below a robotic arm 60 by means of a plurality of fastening members 12 (for example, 3 screws). A supporting membrane 32 is located between the wafer 40 and the top ring module 10 for use as an elastic cushion between the wafer 40 and the top ring module 10. Furthermore, a guide ring 20 is installed around a surface of top ring module 10 for holding the wafer within the top ring module 10, wherein the surface of the top ring module 10 contacts the wafer 40. Hence, the wafer 40 would not jump out of the top ring module 10 while in the motion of spinning. During the CMP process, the slurry (not shown) composed of chemicals and polishing particles is filled in the central area of the turntable. Due to the centrifugal force produced form the spinning of the turntable, the slurry is dispersed onto the other areas of the turntable, and thus the slurry enters the area between the wafer 40 and the polishing pad 30 for performing the polishing process.

Please continuously refer to FIG. 1. Since the guide ring 20 directly contacts the polishing pad 30, the guide ring 20 will be worn out and has to be replaced after the CMP process has been running for a certain amount of time. Referring to FIG. 2, FIG. 2 is a three-dimensional schematic view showing the structures of the top ring module and the guide ring from the conventional CMP machine, wherein a top ring flange 16 located on the lower part of the top ring module 10 is first inserted into the guide ring 20, and then a plurality of top ring grooves 14 are aligned respectively with a plurality of fixing holes 24 on the guide ring 20, and thereafter a plurality of screws (not shown) are installed into the aligned top ring grooves 14 and fixing holes 24 for closely engaging the top ring module 10 and the guide ring 20. Since some slurry is stuck in the gap between the top ring module 10 and the guide ring 20, it will become even more difficult to disengage the top ring module 10 from the guide ring 20 once the slurry is solidified. Therefore, the conventional method for replacing a guide ring is first to release a combined body of the top ring module 10 and the guide ring 20 from the top ring shaft 50 located below the robotic arm 60, and then to take out the screws between the top ring module 10 and the guide ring 20, and thereafter to soak the combined body in water for 30 minutes or tap the top ring module 20 with a tool, thereby disengaging the guide ring 20 from the top ring module 10. However, it takes too much time for the conventional method to soak the combined body in water for 30 minutes. On the other hand, the top ring module 10 is easily to get cracked if the maintenance crew tries to force out the guide ring 20 by tapping the top ring module 10 too hard, and the top ring module 10 cracked usually has to be totally scrapped, which results in the increase of cost.

Hence, it is very urgent to develop an auxiliary tool and for dismantling a guide ring and an application method of the same to replace the conventional method for replacing a guide ring, thereby saving hours of labor and preventing the top ring module from cracking and being totally scrapped.

SUMMARY OF THE INVENTION

Just as mentioned above, since the conventional method for replacing a guide ring has to soak a combined body of a top ring module and a guide ring in water for 30 minutes or tap the combined body with a tool, it not only takes a lot of time and effort, but also easily cracks the top ring module for causing the top ring module to be totally scrapped.

Hence, the major object of the present invention is to provide an auxiliary tool for dismantling a guide ring, and an application method of the same, to effectively replace the conventional method for replacing a guide ring. The present invention does not need to soak a combined body of a top ring module and a guide ring in water for 30 minutes or tap the combined body with a tool, thereby saving the hours of labor, and preventing the top ring module form cracking so that the top ring module can be surely kept in one piece.

Furthermore, the other object of the present invention is to provide an auxiliary tool for dismantling a guide ring, and an application method of the same, so that a scrapped guide ring can be turned into a useful auxiliary tool for dismantling a guide ring. Thus, not only the cost for replacing a guide ring can be reduced, but also the targets of environmental protection and recycling can be attained.

According the objects mentioned above, the present invention provides an auxiliary tool for dismantling a guide ring, and an application method of the same. The auxiliary tool of the present invention is to install a plurality of supporting elements (for example, screws) on a fixture guide ring having the same structure as a guide ring that is desired to be dismantled (for example, a scrapped guide ring having the same model number with the guide ring can be used as the fixture guide ring), thereby dismantling the guide ring from a top ring module which is closely engaged with the guide ring. Furthermore, a plurality of buffer pads are installed on the fixture guide ring among the holes of the auxiliary tool of the present invention for avoiding damaging the top ring module in the process of dismantling the guide ring.

According the present invention, the application of the auxiliary tool for dismantling a guide ring is first to respectively insert the supporting elements of the auxiliary tool into the grooves of the top ring module, and then to disengage the guide ring from the top ring module by tapping a combined surface of the guide ring and the top ring module in a way like plotting a circle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention discloses an auxiliary tool for dismantling a guide ring, and an application method of the same. The auxiliary tool of the present invention is to install a plurality of supporting elements on a plurality of holes of a fixture guide ring having the same structure as a guide ring to be dismantled, thereby dismantling the guide ring that is closely engaged with a top ring module. The application method of the auxiliary tool of the present invention is first to insert the supporting elements of the auxiliary tool into the grooves of the top ring module, and then to disengage the guide ring from the top ring module by tapping the guide ring and the top ring module that are closely engaged.

Figure 1:
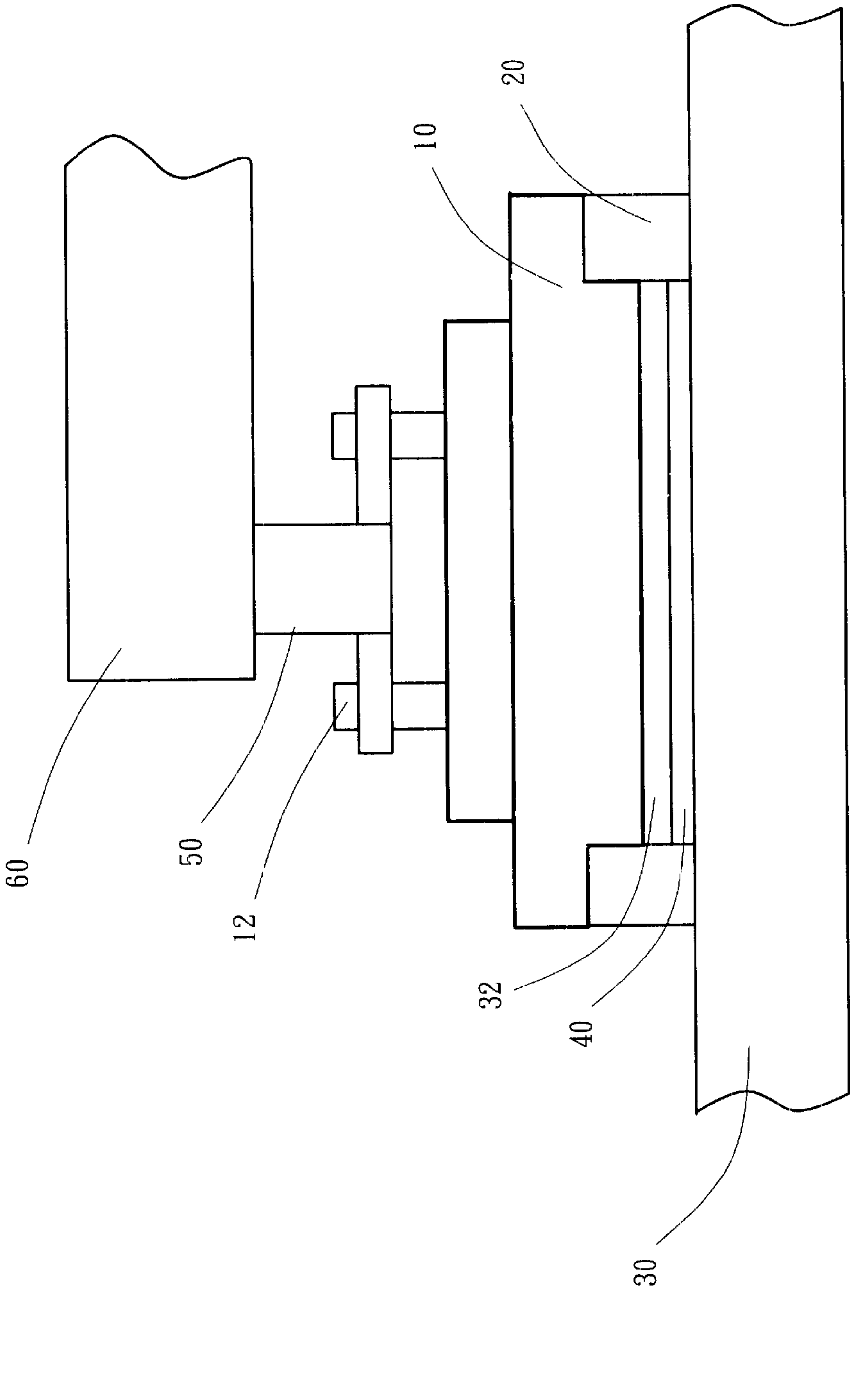
Fig. 1 (Prior Art)
FIG. 1 is a schematic diagram showing the structure of a conventional CMP machine.
Figure 2:
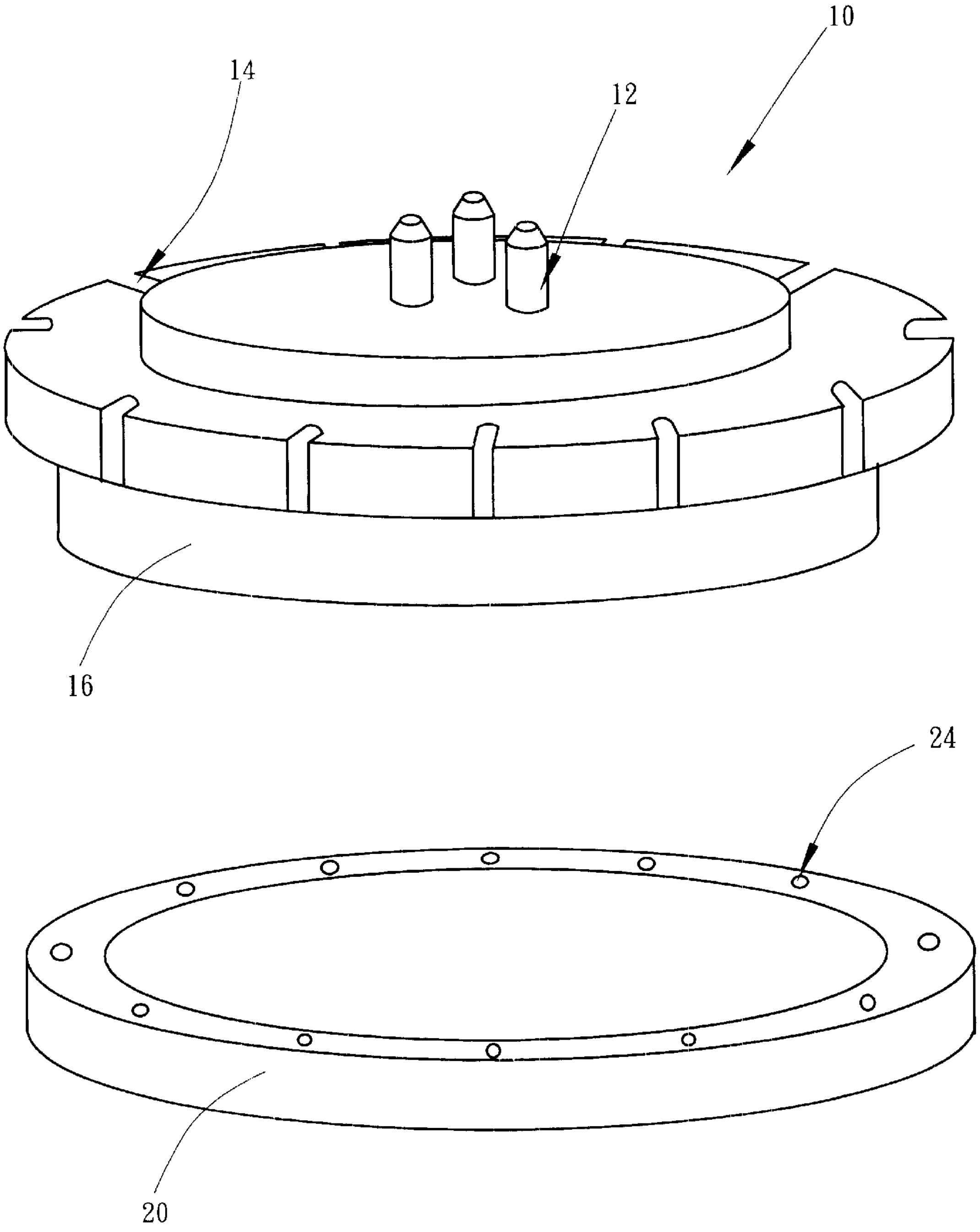
Fig. 2 (Prior Art)
FIG. 2 is a three-dimensional schematic view showing the structures of the top ring module and the guide ring from the conventional CMP machine.
Figure 3:
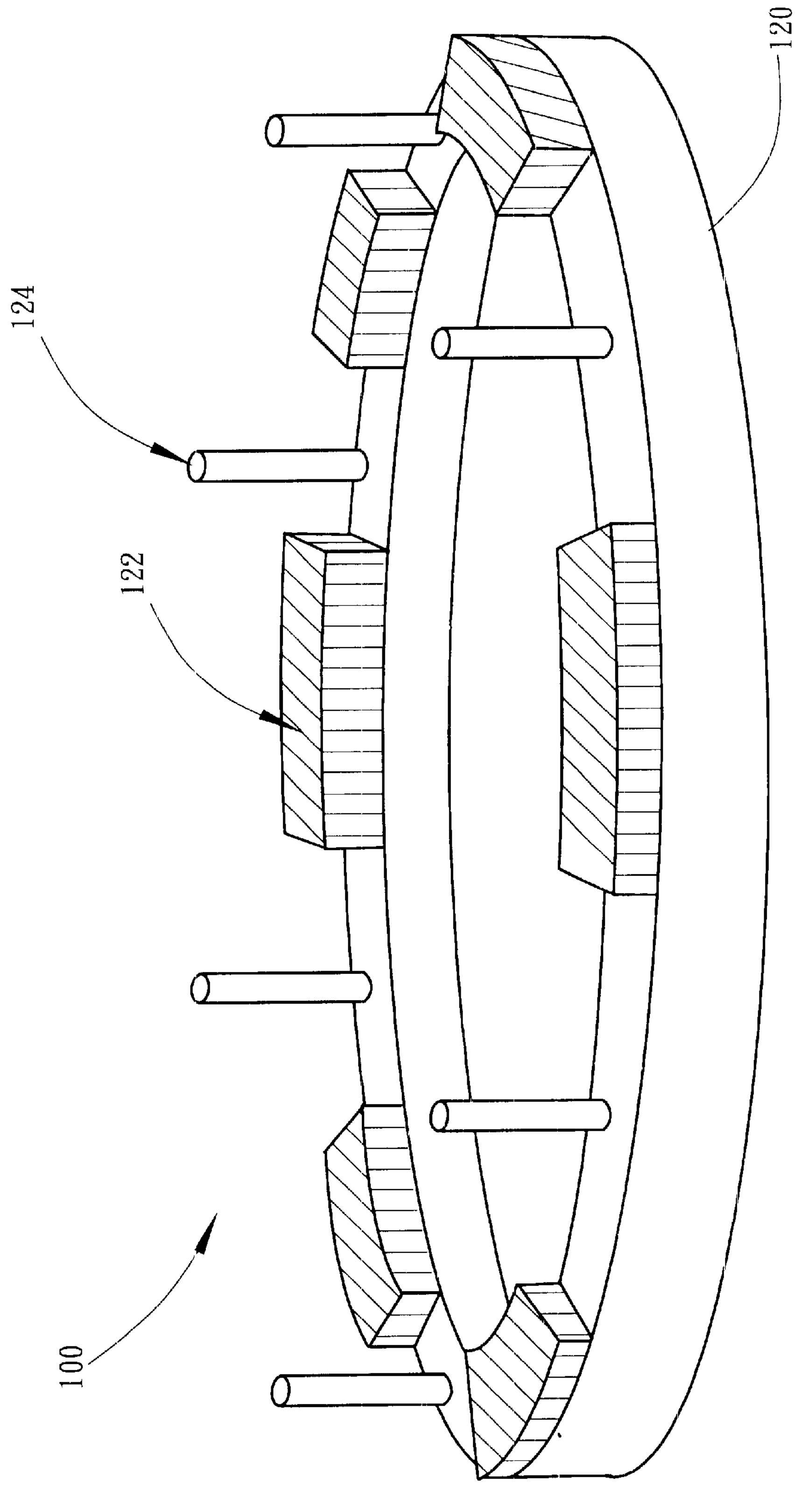
FIG. 3 is a three-dimensional schematic view showing the structure of an auxiliary tool for dismantling a guide ring according to a preferred embodiment of the present invention.
Figure 4:
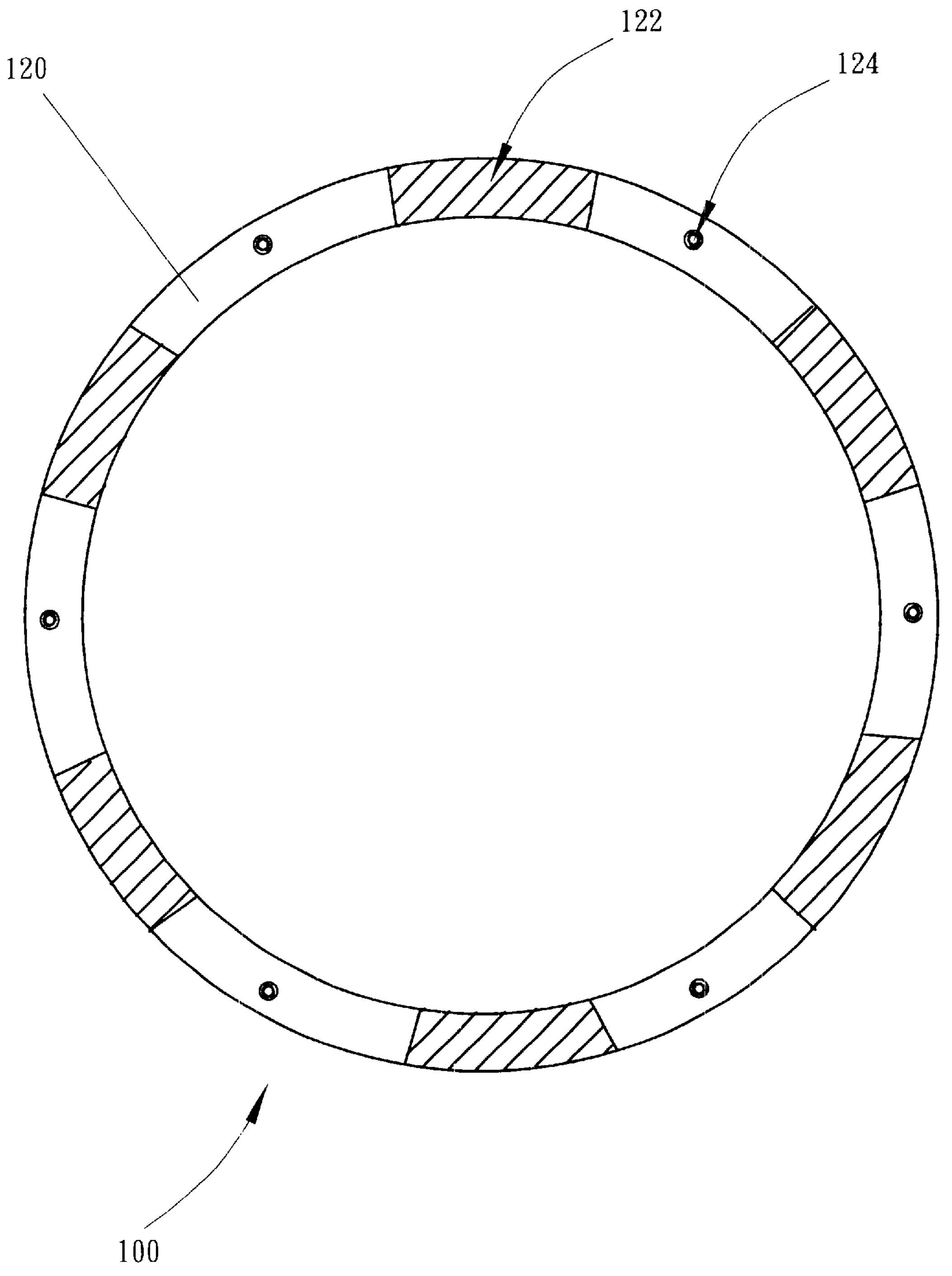
FIG. 4 is a top view showing the structure of an auxiliary tool for dismantling a guide ring according to a preferred embodiment of the present invention.

Referring to FIG. 3 and FIG. 4, FIG. 3 is a three-dimensional schematic view showing the structure of an auxiliary tool for dismantling a guide ring according to a preferred embodiment of the present invention, and FIG. 4 is a top view showing the structure of an auxiliary tool for dismantling a guide ring according to a preferred embodiment of the present invention. Please also continuously refer to FIG. 3. The auxiliary tool of the preferred embodiment of the present invention is applied on a CMP machine, for example, a CMP machine manufactured by Ebara Corporation, Japan. For the sake of explanation, the guide ring 20 and top ring module 10 shown in FIG. 2 are used as the objects to be dismantled in the following description:

As shown in FIG. 3, a fixture guide ring 120 of an auxiliary tool 100 has the same structure with the guide ring 20. In the preferred embodiment of the present invention, the fixture guide ring 120 can be a brand new or scrapped guide ring having the same model number with the guide ring 20. For the cost reduction and environmental protection, the present invention utilizes a scrapped guide ring as the fixture guide ring 120. The fixture guide ring 120 has fixture fixing holes (not shown) that are identical to the fixing holes 24 of the guide ring 20, for example, 12 holes. The auxiliary tool 100 for dismantling a guide ring is to respectively install supporting elements 124 on several symmetric holes (for example, 6 holes) of the fixture fixing holes, wherein the supporting elements 124 can be, for example, screws. After the supporting elements 124 are respectively inserted into the top ring grooves 14 of the top ring module 10, while the maintenance crew is tapping a combined surface of the guide ring 20 and the top ring module 10 in a way like plotting a circle, the supporting elements 124 provides a counter-reaction force of which the direction is opposite to that of plotting the circle so as to stop the top ring module 10 from moving along with the guide ring 20, so that the top ring module 10 and the guide ring 20 can be disengaged easily. Based on the actual situations, the present invention can also respectively install the supporting elements 124 on all or less (for example, 3 holes) fixture fixing holes.

Furthermore, the present invention install buffer pads 122 on the fixture guide ring 120 among the supporting elements 124. In order to allow the supporting elements 124 can be inserted deeper into the top ring grooves 14 as shown in FIG. 2, the buffer pads 122 should not be too thick. The buffer pads are used for preventing the top ring module 10 from being damaged in the process of dismantling the guide ring 20 after the auxiliary tool 100 is combined with the top ring module 10. Therefore, the optimum thickness of buffer pads 122 is one half of the length of supporting element 124. As to the shape of the buffer pads 122, except the shape as shown in FIG. 3 and FIG. 4, where the surface of the fixture guide ring 120 among the supporting elements 124 is partially covered, the buffer pads 122 also may be extended to cover the entire surface of the fixture guide ring 120 among the supporting elements 124. The aforementioned quantity and shape of the supporting elements 124, and the aforementioned thickness and shape of the buffer pads 122 are merely stated as examples for explanation. The auxiliary tool of the present invention for dismantling a guide ring is not limited thereto.

Figure 5:
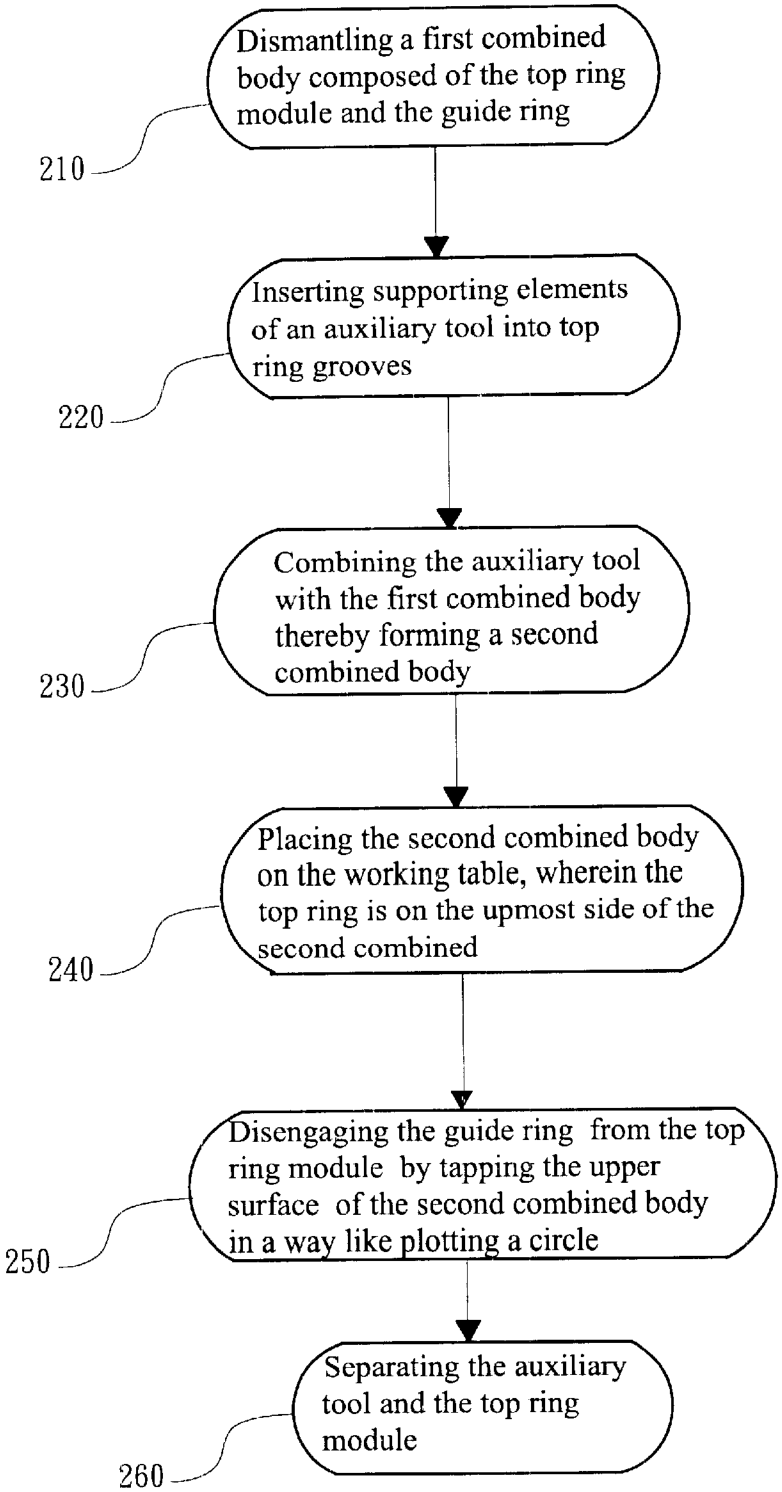
FIG. 5 is a flow chart showing the application method of an auxiliary tool for dismantling a guide ring according to a preferred embodiment of the present invention.

Referring to FIG. 5, FIG. 5 is a flow chart showing the application method of an auxiliary tool for dismantling a guide ring according to a preferred embodiment of the present invention. The application method of the preferred embodiment of the present invention is described as follows:

Please also refer to FIGS. 1 to 4. Step 210 is first to be performed for dismantling a first combined body composed of the top ring module 10 and the guide ring 20. At step 210, the first combined body of the top ring module 10 and the guide ring module 20 is released from a top ring shaft 50 of a robotic arm 60 by loosening fastening members 12 located on the top ring module 10. For the sake of convenience, the first combined body had better be placed on a working table (not shown) with the top ring module 10 being on the upmost side of the first combined body. Then, step 220 is performed for inserting supporting elements 124 of an auxiliary tool 100 into top ring grooves 14 located on the top ring module 10 of the first combined body. Then, step 230 is performed for combining the auxiliary tool 100 with the first combined body composed of the top ring module 10 and the guide ring 20, thereby forming a second combined body composed of the auxiliary tool 100, the top ring module 10 and the guide ring 20. Thereafter, step 240 is performed for placing the second combined body on the working table, wherein the guide ring 20 is on the upmost side of the second combined body. Then, step 250 is performed for disengaging the guide ring 20 from the top ring module 10 by tapping the upper surface of the second combined body in a way like plotting a circle. During the tapping process of step 250, buffer pads 122 can protect the top ring module 10 from being hit and damaged. Thereafter, step 260 is performed for separating the auxiliary tool 100 and the top ring module 10, so that the process for replacing the guide ring 20 can be smoothly completed.

To sum up, the present invention advantageously provides an auxiliary tool for dismantling a guide ring, and an application method of the same, to effectively replace the conventional method for replacing a guide ring. Since the present invention does not need to soak a combined body of a top ring module and a guide ring in water or tap the combined body with a tool, therefore the hours of labor are reduced, and the top ring module is prevented form cracking so as to keep the top ring module in one piece.

The present invention further advantageously provide an auxiliary tool for dismantling a guide ring, and an application method of the same, for turning a scrapped guide ring into a useful auxiliary tool for dismantling a guide ring. Therefore, not only the cost for replacing a guide ring can be reduced, but also the targets of environmental protection and recycling can be attained.

As is understood by a person skilled in the art, the foregoing preferred embodiment of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An application method of an auxiliary tool for dismantling a guide ring, the application method being applied on a CMP machine for dismantling a top ring module having a plurality of top ring grooves and a guide ring having a plurality of fixing holes, the application method comprising:

- providing an auxiliary tool, wherein the auxiliary tool comprises:
  - a fixture guide ring, wherein the fixture guide ring has a plurality of fixture fixing holes; and
  - a plurality of supporting elements, wherein the plurality of supporting elements are respectively installed on the plurality of fixture fixing holes;
  - dismantling a first combined body composed of the top ring module and the guide ring;
  - inserting the plurality of supporting elements of the auxiliary tool into the plurality of top ring grooves located on the top ring module of the first combined body;
  - combining the auxiliary tool with the first combined body of the top ring module and the guide ring, thereby forming a second combined body composed of the auxiliary tool, the top ring module and the guide ring;
- placing the second combined body on a working table, wherein the top ring is on an upmost side of the second combined body;
- disengaging the guide ring from the top ring module by tapping an upper surface of the second combined body; and
- separating the auxiliary tool and the top ring module.

2. The application method of an auxiliary tool for dismantling a guide ring according to claim 1, wherein the number of the plurality of fixture fixing holes is twelve, and the number of the plurality of supporting elements is six.

3. The application method of an auxiliary tool for dismantling a guide ring according to claim 1, wherein the plurality of supporting elements are screws.

4. The application method of an auxiliary tool for dismantling a guide ring according to claim 1, wherein the step of disengaging the guide ring from the top ring module is performed by tapping the upper surface of the second combined body in a way similar to plotting a circle.

5. The application method of an auxiliary tool for dismantling a guide ring according to claim 1, wherein the auxiliary tool further comprises a plurality of buffer pads located on the fixture guide ring among the plurality of supporting elements, thereby protecting the top ring module while the step of disengaging the guide ring from the top ring module by tapping the upper surface of the second combined body is performed.

6. The application method of an auxiliary tool for dismantling a guide ring according to claim 5, wherein the thickness of the plurality of buffer pads is one half of the length of the plurality of supporting elements.

7. The application method of an auxiliary tool for dismantling a guide ring according to claim 5, wherein the plurality of buffer pads cover a partial surface of the fixture guide ring among the plurality of supporting elements.

8. The application method of an auxiliary tool for dismantling a guide ring according to claim 5, wherein the plurality of buffer pads cover an entire surface of the fixture guide ring among the plurality of supporting elements.

9. The application method of an auxiliary tool for dismantling a guide ring according to claim 1, wherein the fixture guide ring has the same structure as the guide ring.

* * * * *